United States Patent [19]
Hewitt

[11] Patent Number: 6,034,445
[45] Date of Patent: Mar. 7, 2000

[54] POWER SOURCE TRANSFER LOCKOUT CIRCUIT

[75] Inventor: Timothy E. Hewitt, Goshen, Ind.

[73] Assignee: White Consolidated Industries, Inc., Cleveland, Ohio

[21] Appl. No.: 09/134,003

[22] Filed: Aug. 14, 1998

[51] Int. Cl.[7] .............................. H02J 1/00; H01H 3/34
[52] U.S. Cl. ........................... 307/80; 307/10.1; 307/135; 307/141.8
[58] Field of Search .................... 307/9.1, 10.1, 307/43, 44, 64, 65, 66, 80, 85, 86, 87, 10.7, 18, 23, 29, 112, 116, 125–127, 130, 131, 135, 137, 141, 141.4, 141.8

[56] References Cited

U.S. PATENT DOCUMENTS

| | | | |
|---|---|---|---|
| 3,808,451 | 4/1974 | Pittet ............................................. | 307/64 |
| 4,172,980 | 10/1979 | Hsieh et al. .................................. | 307/9 |
| 4,262,212 | 4/1981 | Jacob et al. .................................. | 307/9 |
| 4,262,214 | 4/1981 | Patel ............................................. | 307/51 |
| 4,384,213 | 5/1983 | Bogel ........................................... | 307/64 |
| 4,617,472 | 10/1986 | Slavik ...................................... | 307/10 R |
| 4,733,100 | 3/1988 | Nusairat et al. ............................. | 307/9 |
| 4,754,159 | 6/1988 | Pointout et al. ............................. | 307/9 |
| 4,780,618 | 10/1988 | Wareman et al. ............................ | 307/9 |
| 5,070,252 | 12/1991 | Castenschidd et al. .................... | 307/64 |
| 5,734,239 | 3/1998 | Turner ...................................... | 318/142 |
| 5,739,594 | 4/1998 | Sheppard et al. .......................... | 307/64 |
| 5,790,399 | 8/1998 | Campbell .................................. | 307/18 |
| 5,874,786 | 2/1999 | McVey et al. ............................. | 307/9.1 |

*Primary Examiner*—Richard T. Elms
*Attorney, Agent, or Firm*—Pearne, Gordon, McCoy & Granger LLP

[57] ABSTRACT

Electrical loads are powered by one of several different power sources through a selector switch. A monitoring circuit monitors the different power sources to sense a change of state, that is, power up or shut down. Such a change indicates that the selector switch is likely to be operated to select a new power source. The monitoring circuit shuts down certain loads to limit current surges when the new power source is connected.

15 Claims, 2 Drawing Sheets

POWER SOURCE TRANSFER LOCKOUT CIRCUIT

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

This invention relates generally to the field of power monitoring and specifically to monitoring power sources for recreational vehicles.

Recreational vehicles are normally equipped so that electrical loads can be powered from one of several different sources. Typical sources include a battery on the vehicle, a generator on the vehicle, and "shore" power from a commercial power system to which the vehicle is connected. Depending on the availability of different power sources and the demands of vehicle loads, the power source is transferred from one to another. When the new source begins supplying power, a current surge occurs as the loads are powered simultaneously. Therefore, it is common to shut down loads that draw high starting currents prior to changing power sources.

BRIEF SUMMARY OF THE INVENTION

The present invention provides a power circuit including first and second power sources. A power bus is connected to provide power to loads and a transfer switch is provided for selectively connecting the power bus to one of the power sources. A load is connected to receive power from the power bus, and a controller is connected to control power supplied to the load from the power bus. A monitoring circuit includes first and second sensors for monitoring the first and second power sources, respectively, wherein the monitoring circuit causes the controller to disconnect the power bus from the load when a state of one of the power sources changes.

The controller reconnects the power bus to the load after a time delay. Disconnection of power to the controller causes the controller disconnection of the power bus from the load. A second power bus is connected to provide power to the controller. The first and second power sources provide alternating current and the second power bus is connected to a direct current source. A switch is connected between to the controller wherein the monitoring circuit is connected to interrupt power to the controller by opening the switch. The monitoring circuit includes a one-shot pulse generator connected to operate the switch. The sensors are connected to inputs of an XOR gate and an output of the XOR gate is connected to cause the disconnection of the power bus. The power bus is disposed in a vehicle for providing power to vehicle loads. The load is a motor driving a compressor.

The invention also provides a method of monitoring a power system including the steps of monitoring each of plural power sources connectable to a power bus supplying power to a load; disconnecting a load from the power bus when a state of one of the monitored power sources changes; and permitting reconnection of the load to the power bus after a delay. The change of state causes generation of a pulse and the pulse opens a switch that causes the disconnection of the load from the power bus. Opening the switch disconnects power to a controller and disconnection of power to a controller causes the controller perform the disconnection of the load from the power bus.

DESCRIPTION OF THE INVENTION

Figure 1:
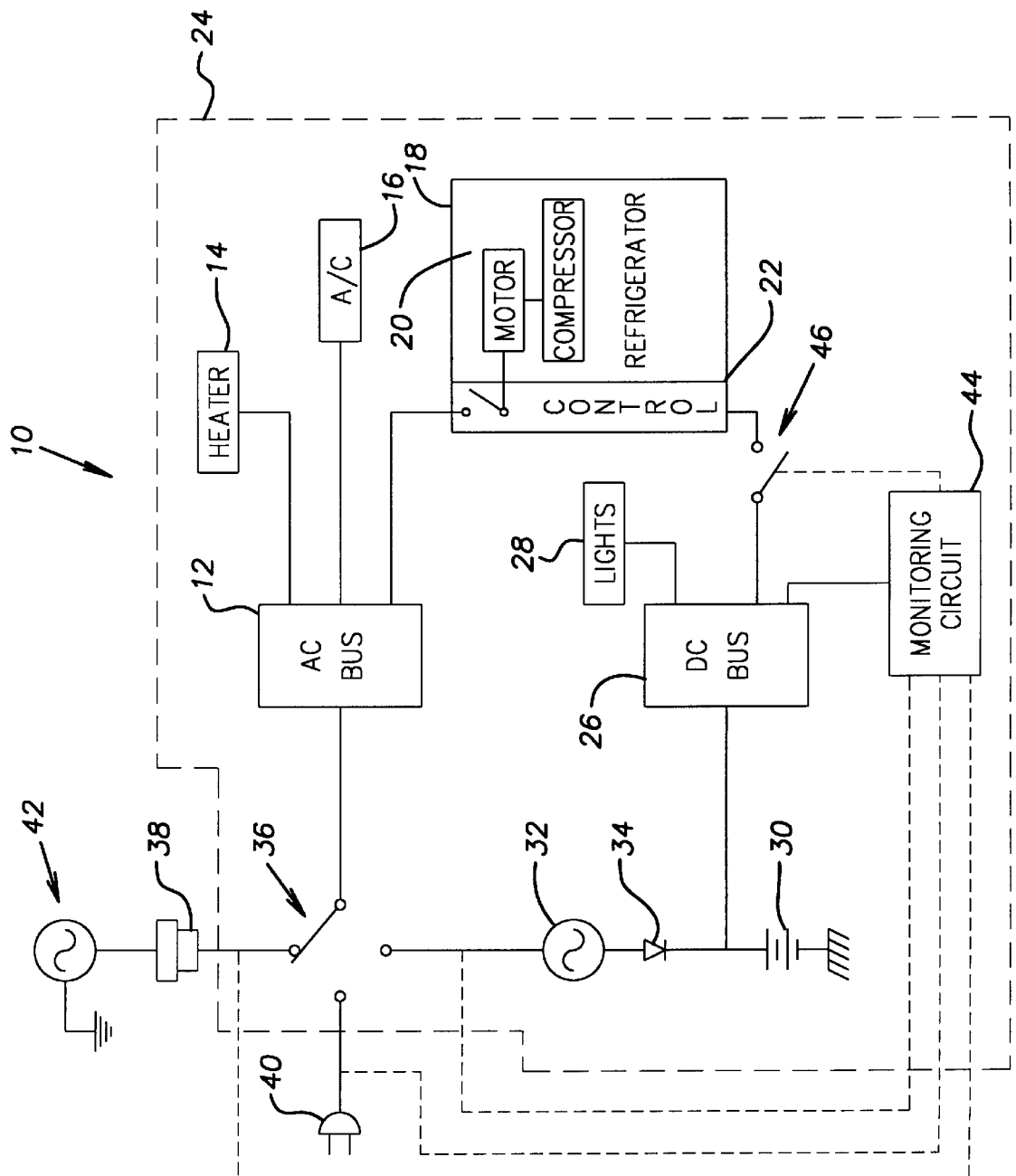
FIG. 1 shows a schematic diagram of a power system for a vehicle having a monitoring system according to the invention.

Referring to FIG. 1, a power system 10 includes an alternating current (AC) bus 12, such as a breaker panel, switch box, or fuse box. The AC bus 12 is connected to distribute power to electrical loads. The loads include, for example, a heater 14, an air conditioner 16, and a refrigerator 18. In the following description, the refrigerator will be used as an exemplary load. The refrigerator includes a compressor driven by a motor 20. Power to the motor and other components of the refrigerator is controlled by a controller 22. Preferably, the AC bus and the loads are installed in a recreational vehicle 24.

The vehicle 24 also includes a direct current (DC) bus 26 connected to power various loads including lights 28 and the refrigerator controller 22. The DC bus is connected to receive power from a battery 30, which is charged by an AC generator 32 through a rectifier 34.

Power is provided to the AC bus 12 through a selector switch 36 connectable to multiple AC power sources. The selector switch 36 is adapted for connecting the AC bus 12 to one of the AC power sources. For example, forward and aft shore power connectors 38, 40 are connected to the selector switch 36 and adapted for being connected to a commercial power system 42. The generator 32 is also connected to the selector switch 36. Thus, the selector switch can be operated to select the generator or the commercial power system as the source of power for the AC bus.

A monitoring circuit 44 is connected to operate a normally closed switch 46 connecting the DC bus 26 to the refrigerator controller 22. The monitoring circuit 44 is connected to monitor each of the AC power sources 32, 38, 40.

Figure 2:
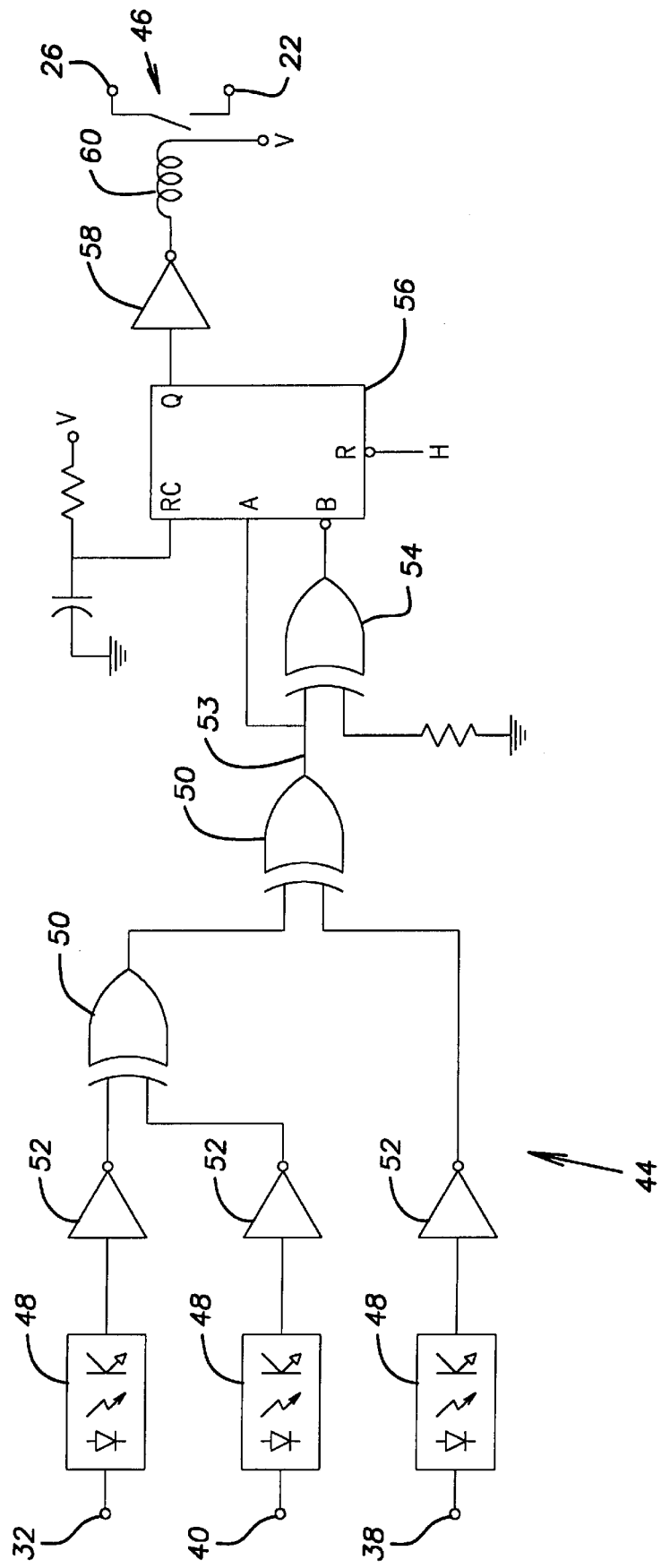
FIG. 2 shows a schematic diagram of the monitoring system according to the invention.

Referring to FIG. 2, the monitoring circuit 44 includes optoisolators 48 having inputs connected to each of the power sources 32, 38, 40. Outputs of the optoisolators are connected to inputs of two input exclusive OR (XOR) gates 50 through inverters 52 to obtain a power source signal 53 that indicates a change in state of any of the power sources 32, 38, 40. That is, when one of the power sources is powered up or shut down, the power source signal 53 will change from HIGH to LOW or LOW to HIGH. A triggering XOR gate 54 has one input connected to ground and the other input connected to the power source signal 53. The power source signal 53 is also connected to a triggering input A of a pulse generator 56. Preferably, the pulse generator 56 is a monostable multivibrator (e.g. Motorola MC54/74HC4538A). The output of the triggering XOR gate 54 is connected to an inverting input B of the pulse generator 56. A reset input R of the pulse generator 56 is maintained in a HIGH state and an RC network connected to the RC input sets the pulse width at about 30 seconds. That is, the resistor is 500 KΩ and the capacitor is 100 µF. The output Q of the pulse generator is connected through an inverter 58 to a coil 60 that operates the switch 46. The switch 46 and coil 60 are preferably a relay, but can be another type of electrically operated switch. The monitoring circuit also includes various and sundry filters, diodes, resistors, power connections, etc., which have been omitted for simplicity.

Referring to FIGS. 1 and 2, the selector switch 36 is set to connect the AC bus 12 to an available power source, for example, commercial power 42 provided through the forward shore power connector 38. When a different source of power is to be used, the different source will be powered up or connected. For example, when the vehicle 24 is to be moved, the vehicle will be started, thereby activating the generator 32. Activation of the generator 32 causes the corresponding optoisolator to generate a signal that, through the XOR gates 50, causes the state of the trigger input A to change and then, through the trigger XOR gate 54, causes the state of the inverting input B to change. The change of input states A, B triggers the pulse generator to generate a pulse at the output Q. The pulse is approximately 30 seconds in duration and holds the switch 46 open during that time thereby disconnecting the controller 22 from DC power. The controller 22 is configured such that a sustained power interruption, for example greater than 10–20 seconds, will cause the controller to disconnect the AC bus 12 from the motor 20. The selector switch 36 is operated to disconnect the AC bus from one power source, for example forward shore power, and connect the AC bus to another power source, for example generator power. Power is disconnected from the motor 20 for a time sufficient to permit switching of the selector switch, restarting of other electrical loads, and decay of current surges. Approximately 130 seconds of disconnect time is adequate in most recreational vehicle installations. When the controller makes AC power available to the motor again, operation continues normally. Typically, the original power source, forward shore power in the example, will be disconnected or unavailable after the selector switch is changed. If this occurs during the disconnect time, there is no effect on operation. If, however, this occurs after the disconnect time, a second disconnection of power to the controller, and thus the motor, will occur because the monitoring system 44 will detect the change of state of the power source. In some cases, the state of a power source will change even though the selector switch will not be operated imminently. This will cause an unwanted disconnect of the compressor motor 20 from AC power, but will not adversely affect operation.

The present disclosure describes several embodiments of the invention, however, the invention is not limited to these embodiments. Other variations are contemplated to be within the spirit and scope of the invention and appended claims.

What is claimed is:

1. A power circuit comprising:
   first and second power sources;
   a power bus connected to provide power to loads;
   a transfer switch for selectively connecting the power bus to one of the power sources;
   a controlled load connected to receive power from the power bus;
   a controller connected to control power supplied to the controlled load from the power bus; and
   a monitoring circuit including first and second sensors for monitoring the first and second power sources, respectively, wherein the monitoring circuit is connected to cause the controller to disconnect the power bus from the controlled load when a state of one of the power sources changes.

2. The power circuit according to claim 1 wherein the controller reconnects the power bus to the controlled load after a time delay.

3. The power circuit according to claim 2 wherein interruption of power to the controller causes the controller to disconnect the power bus from the controlled load.

4. The power circuit according to claim 1 wherein interruption of power to the controller causes the controller to disconnect the power bus from the controlled load.

5. The power circuit according to claim 4 further comprising a second power bus connected to provide power to the controller.

6. The power circuit according to claim 5 wherein the first and second power sources provide alternating current and the second power bus is connected to a direct current source.

7. The power circuit according to claim 4 further comprising a switch connected between the controller and a second power bus, and wherein the monitoring circuit is connected to interrupt power to the controller by opening the switch.

8. The power circuit according to claim 1 wherein the power bus is disposed in a vehicle for providing power to vehicle loads.

9. The power circuit according to claim 8 wherein the controlled load is a motor driving a refrigerator compressor.

10. A power circuit comprising:
    first and second power sources;
    a direct current power bus;
    a alternating current power bus connected to provide power to loads;
    a transfer switch for selectively connecting the alternating current power bus to one of the power sources;
    a motor connected to receive power from the alternating current power bus;
    a controller powered from the direct current bus and connected to control power supplied to the motor from the alternating current power bus, wherein the controller disconnects the motor from the alternating power bus when the controller is disconnected from the direct current bus;
    an electrically operated switch connected to disconnect the direct current power bus from the controller; and
    a monitoring circuit including first and second sensors and a pulse generator, the sensors being connected for monitoring the first and second power sources, respectively, and connected to the pulse generator wherein the sensors trigger the pulse generator to open the electrically operated switch when a state of one of the power sources changes.

11. A method of monitoring a power system comprising the steps of:
    monitoring each of plural power sources connectable to a power bus supplying power to a load;
    disconnecting a load from the power bus when a state of one of the monitored power sources changes; and
    permitting reconnection of the load to the power bus after a delay.

12. The method according to claim 11 wherein the change of state causes generation of a pulse and the pulse opens a switch that causes the disconnection of the load from the power bus.

13. The method according to claim 12 wherein opening the switch disconnects power to a controller and disconnection of power to a controller causes the controller perform the disconnection of the load from the power bus.

14. A power circuit comprising:

first and second power sources;

a power bus connected to provide power to loads;

a transfer switch for selectively connecting the power bus to one of the power sources;

a controlled load connected to receive power from the power bus;

a controller connected to control power supplied to the controlled load from the power bus;

a monitoring circuit including first and second sensors for monitoring the first and second power sources, respectively, wherein the monitoring circuit is connected to cause the controller to disconnect the power bus from the controlled load when a state of one of the power sources changes; and wherein interruption of power to the controller causes the controller to disconnect the power bus from the controlled load; and a switch connected between the controller and a second power bus, and wherein the monitoring circuit is connected to interrupt power to the controller by opening the switch and wherein the monitoring circuit includes a one-shot pulse generator connected to operate the switch.

15. A power circuit comprising:

first and second power sources;

a power bus connected to provide power to loads;

a transfer switch for selectively connecting the power bus to one of the power sources;

a controlled load connected to receive power from the power bus;

a controller connected to control power supplied to the controlled load from the power bus; and a monitoring circuit including first and second sensors for monitoring the first and second power sources, respectively, wherein the monitoring circuit connected to cause the controller to disconnect the power bus from the controlled load when a state of one of the power sources changes and wherein the sensors are connected to inputs of an XOR gate and an output of the XOR gate is connected to cause the disconnection of the power bus.

* * * * *